Sept. 13, 1960  H. L. BURNS  2,952,264
REGULATOR FOR PRESSURIZING DEVICE
Filed March 11, 1955  2 Sheets-Sheet 1

INVENTOR.
HENRY L. BURNS
BY

Sept. 13, 1960
H. L. BURNS
2,952,264
REGULATOR FOR PRESSURIZING DEVICE
Filed March 11, 1955
2 Sheets-Sheet 2
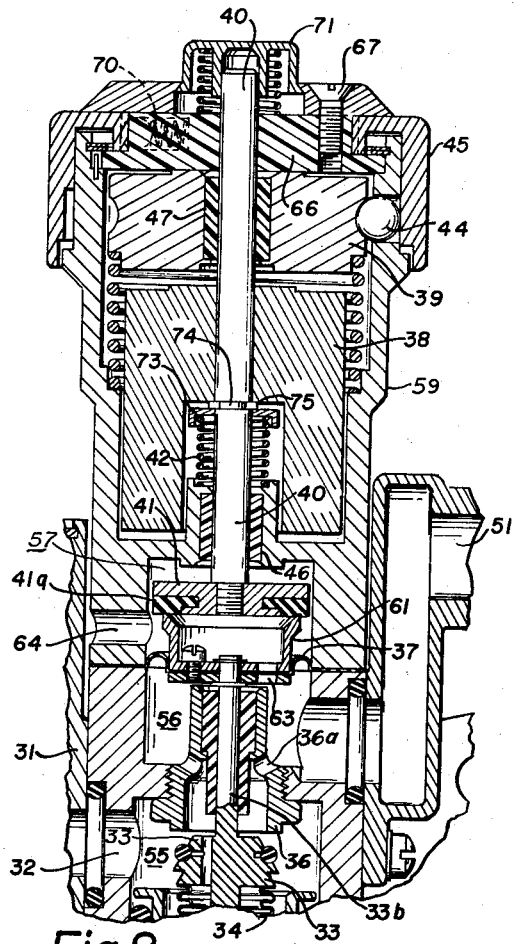
Fig.2
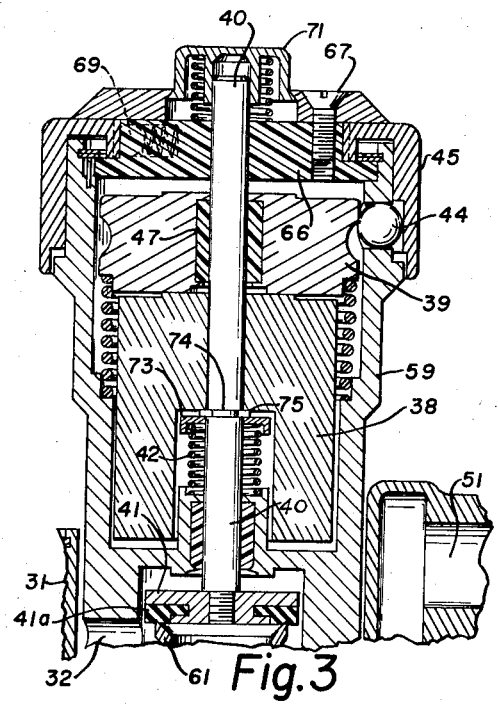
Fig.3
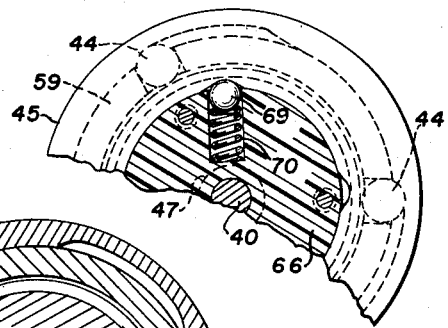
Fig.6
Fig.4
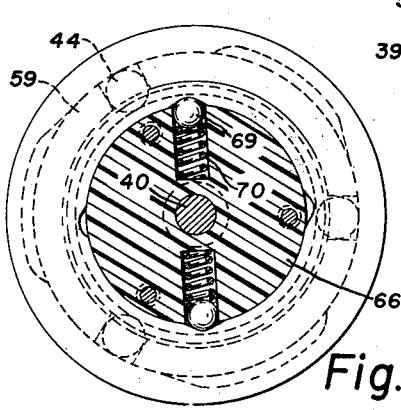
Fig.5
INVENTOR.
HENRY L. BURNS
BY United States Patent Office 2,952,264
Patented Sept. 13, 1960

2,952,264

REGULATOR FOR PRESSURIZING DEVICE

Henry L. Burns, Portland, Oreg., assignor to Alar Products, Inc., a corporation of Ohio Filed Mar. 11, 1955, Ser. No. 493,713

16 Claims. (Cl. 137—39)

My invention relates to regulators or valves governing the operation or control of pressurizing devices.

My regulator is particularly adapted for use in aviation wherein maneuvering of aircraft requires sharp turns and changes in elevation. In the sharp turning of aircraft, the body of the pilot or other persons in the plane is subjected to centrifugal force resulting from the revolving of the aircraft sharply or abruptly around the axis of an imaginary line. In the abrupt turning of aircraft, for example, upwardly and over, centrifugal force tends to force the blood in the body of persons in the airplane down into the legs and lower body. As is well known, this forcing of the blood downwardly in the body by centrifugal force drains the blood from the brain and causes unconsciousness or "black-out." This vulnerability of the human body has tended to limit the maneuvering with aircraft so as to assure that centrifugal force does not cause this condition of unconsciousness or "black-out." It is well known that diminishing the blood flow to the brain below a certain minimum level results in unconsciousness of the person.

My regulator is also adapted for regulating a pressurizing device to overcome the effect of acceleration forces encountered in linear acceleration, and is within the scope of the claimed invention.

Research has shown that this "black-out" or unconsciousness can be prevented by applying a "counter-pressure" to the lower extremities, that is, to the legs and lower body. This is done with the use of a so-called anti-"G" suit which is worn by the aviators. This anti-"G" suit generally consists of a snug-fitting garment which incorporates a plurality of inflatable bladders. The arrangement is such that when these bladders are inflated with a fluid under pressure, such as compressed air, the suit will tighten about the legs and lower body to prevent or limit the pooling of blood into the legs and lower part of the body. By this compression of the legs and lower part of the body, the flow of blood to those parts is diminished and there is not the drainage or loss of blood from the brain which would otherwise result. Thus, by inflating the bladders to cause this compression about the legs and body at the proper time prevents the loss of consciousness through an insufficient supply of blood to the brain.

In this discussion, the fluid under pressure will be considered as air under pressure, as this will usually be the most practical fluid to use. The air under pressure may be compressed air from a driven compressor or it may be compressed air from a reservoir tank of compressed air.

In order for the anti-"G" suit to function properly, the air pressure supplied to the bladders of the suit must be of the proper magnitude to prevent blood pooling as a result of centrifugal force and at the same time must not be high enough to block normal circulation. It is therefore necessary that the air pressure be supplied to the suit through an air pressure regulator which will respond and control as a function of centrifugal force. This force is generally referred to as "G," which is an increment of measure of force in terms of units of gravity.

An object of my invention is the provision of an improved regulator for controlling air pressure of the anti-"G" valve, which pressure is a function of "G."

Another object is the provision of a regulating valve particularly adapted to the needs and requirements for the successful use of pressurizing devices, such as anti-"G" suits.

Another object is the provision of an air-pressure regulator having its parts arranged for smooth and efficient operation in accordance with the conditions encountered and particularly in accordance with the centrifugal force to which the regulator is subjected.

Another object is the provision of such a fluid pressure regulator which incorporates a minimum of moving parts to assure a minimum of friction and a maximum of efficiency in its operation.

Another object is the provision of an air-pressure regulator which may be adjusted to meet different requirements and conditions in use.

Another object is the provision of a fluid pressure regulator having mass means responsive to centrifugal force, which mass means may be divided as required.

Still another object is the provision of a fluid pressure regulator which automatically operates in response to centrifugal force and which also may be manually operated as desired.

Other objects and a fuller understanding of this invention may be had by referring to the following description and claims, taken in conjunction with the drawings, in which:

Figure 2 is a sectional view taken through a portion of the device shown in Figure 1 and showing the parts in another position;

Figure 3 is a partial sectional view taken through the device and showing the parts in still another position;

Figure 4 is a cross-sectional view taken through the line 4—4 of Figure 1;

Figure 5 is a cross-sectional view taken through the line 5—5 of Figure 1; and

Figure 6 is a view similar to that of Figure 5 but with the parts revolved to a different position.

Figure 1:
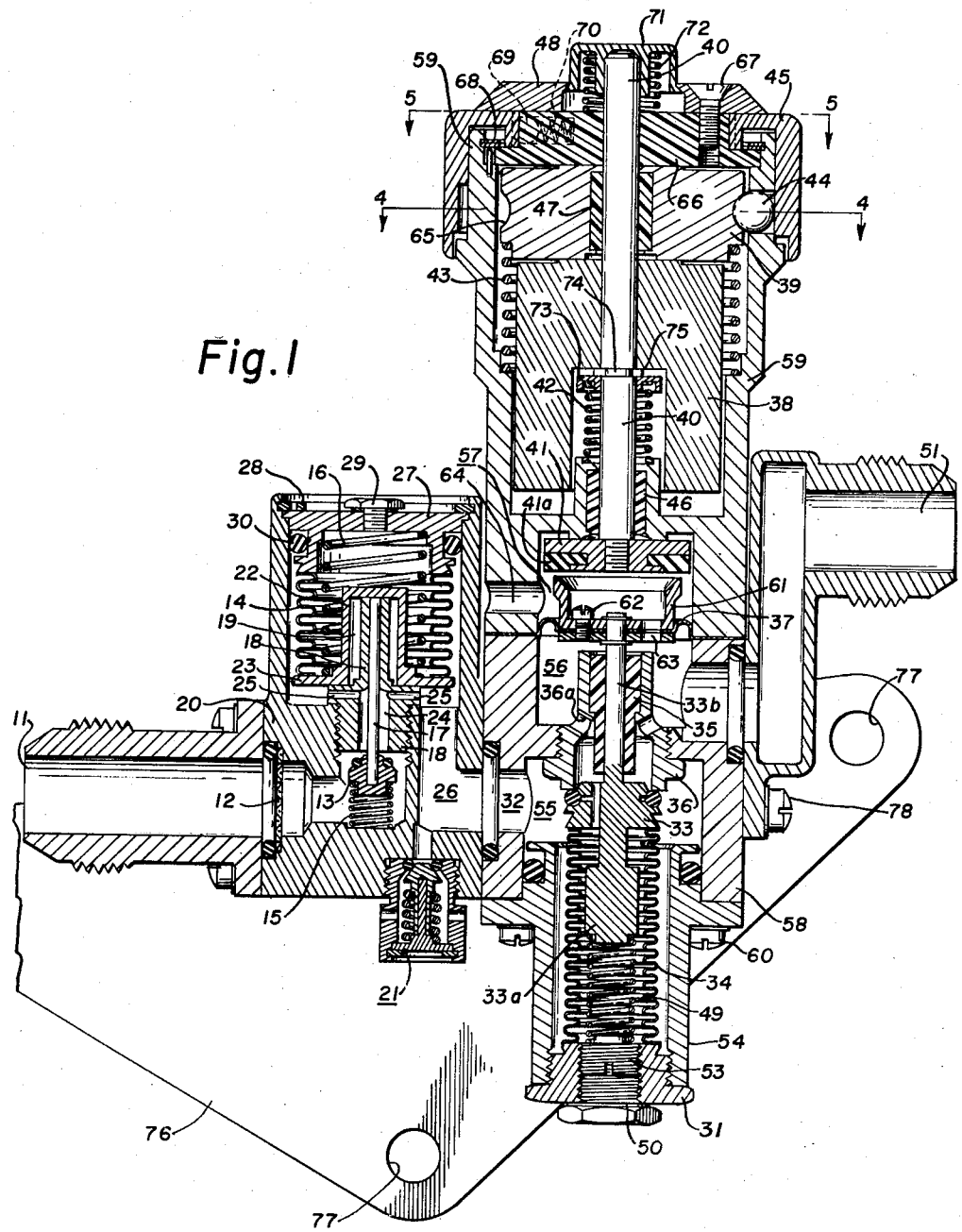
Figure 1 is a longitudinal sectional view taken through my regulator and showing the parts in one position.

Fluid under pressure, such as compressed air, is supplied by an air compressor or a storage cylinder to a conduit connected to the inlet port 11. This fluid, hereinafter referred to as compressed air, passes through a filter screen 12 and is then modulated by a first-stage reduction assembly. This first-stage reduction assembly, including a valve member 13 and a bellows 14, acts as a pressure-sensitive means. The valve member 13 is held in place by a valve spring 15, thus holding the valve member 13 in a seating position. The bellows 14 is loaded to the desired pressure by the bellows spring 16. Action of the bellows 14 is transmitted to the valve 13 through a valve pin or stem 17 which is guided by a seat member 18. The top portion of the seat member 18 carries a low-friction sleeve 19 which serves as a guide for a cup member 22 which is secured to the pin or stem 17. The entire first-stage assembly is enclosed in a detachable housing or body 20. This first-stage assembly provides for the reduction of the air pressure to a uniform and desired degree. A relief valve 21 provides relief against excessive pressure in the first stage.

The cup member 22 has a flange 23 against which is engaged the lower end of the bellows 14 and the lower end of the spring 16. There is an axially extending opening 24 through the seat member 18 and around the valve pin 17. There are radially extending openings 25 extending through the seat member 18 from the axial opening 24. The chamber within the housing or body 20 incorporating the first-stage assembly is denoted generally by the reference character 26. It is thus seen that the compressed air from the inlet port 11 reaches the chamber 26 after having its pressure modulated to a uniform degree.

There is a disk-like head 27 positioned over the bellows 14 and spring 16 within the body 20. A split snap ring 28 engaged in the wall of the body 20 holds the head 27 in position. A screw 29 in the head 27 provides for access to the interior of the bellows 14. A suitable O-ring seal 30 is provided between the head 27 and the inner wall of the body 20.

The main body of the regulator enclosing the regulating valves has an inlet port 32 opening into an inlet chamber 55. The compressed air from the inlet chamber 55 is metered on demand by operation of a control valve member 33. This control valve member 33 is backed by balancing bellows 34, a lower extension 33-a of the control valve member 33 extending down within the balancing bellows 34. The control valve member 33 has an upper stem portion 33-b. The balancing bellows 34 has the same effective area as the seating area of the control valve member 33 so as to eliminate all influence of variation in first-stage pressure.

The control valve member 33 is guided in a low friction sleeve member 35 which is mounted axially in a valve seat member 36. This valve seat member 36 has a plurality of holes 36-a extending therethrough as shown. A flexible diaphragm 37 is mounted within the body of the main regulator device and across the axis of the body. The diaphragm 37 acts as a pressure-sensitive means at the control or regulating stage and is arranged to move the control valve member 33 in opening and in closing directions. The diaphragm 37 is loaded by means of a first weight or mass 38 and a second weight or mass 39 which act through a weight pin or stem 40 and exhaust valve member 41. Mounted to the exhaust valve member 41 is a rubber gasket 41-a. The exhaust valve member 41 has a seat area which is slightly smaller than the area of the control diaphragm 37, with the area differential designed to compensate for the weight of moving valve parts below the exhaust valve member 41 plus an additional differential to assure that exhaust occurs at slightly higher levels than control regulation thereby preventing continuous exhaust.

Counter-weight springs 42 and 43 support the first weight or mass 38 and the second weight or mass 39 at a low "G" to prevent their loading the control diaphragm 37, causing suit inflation before a counter-pressure is required in the suit.

The use of a plurality of weights, here consisting of two weights 38 and 39, is the result of finding that some aviators tolerate more counterpressure than others. Therefore, weights 38 and 39 are so arranged that one weight (39) can be supported by lock-up balls 44 which may be brought into or out of position by rotation of a selector cap assembly 45. The weight pin or stem 40 is guided by low friction inserts 46 and 47 disposed around the stem 40.

A valve spring 49 is set to support all the moving parts below the exhaust valve member 41 and it is provided with an adjustment by an adjusting screw 53 held in place and covered by a cover screw 50 at the bottom of the body.

The body or housing enclosing the controlling valves is made up of several parts. The lower part consists of the lower extension portion 54 having its lower end closed by a plug 31 which holds the adjusting screw 53 and cover screw 50. There is an intermediate body portion 58 to which the lower extension portion 54 is held by bolts 60. An upper or main portion of the body or housing enclosing the control valve parts is denoted by the reference character 59 and this portion 59 is bolted to intermediate portion 58. The diaphragm 37 is firmly held between and sealed by the abutting surfaces of housing portions 58 and 59.

A discharge port extension member 51 is secured to the intermediate portion 58 by means of bolts 78. It will be noted that there is an O-ring providing a seal between the discharge port extension member 51 and the body portion 58, and there is also an O-ring providing a seal between the body portion 58 and the body 20 of the first-stage assembly. The lower chamber in the assembled body making up the housing for the regulator is referred to as inlet chamber 55. The intermediate chamber within the housing and above the control valve 33 is referred to as the discharge chamber 56. The chamber above the diaphragm 37 is referred to as the exhaust chamber 57. It is therefore noted that the chambers 55, 56 and 57 are in axial alignment, the discharge chamber 56 being intermediate of the inlet chamber 55 and the exhaust chamber 57.

Secured to and carried by the diaphragm 37 is a cup valve seat member 61 secured to the diaphragm by bolts 62. There are a plurality of openings 63 extending through the valve seat member 61 and the diaphragm 37 so as to provide communication between the discharge chamber 56 and the exhaust chamber 57. An exhaust port 64 extending through the wall of the body portion 59 provides communication between the exhaust chamber 57 and atmosphere. In other words, air in the exhaust chamber 57 may freely escape to atmosphere and thus be exhausted through the exhaust port 64.

The upper weight 39 has around its outer peripheral wall a circular groove 65 adapted to complement and receive a portion of the balls 44. Above the weight 39 and secured to the top portion of the body portion 59 is a top insert 66 covering the valve body. Screws 67 hold a top cap member 48 to the insert 66, the cap member 48 overlapping a rotatable selector cap 45 to hold it in position while permitting the selector cap to be revolved. A split snap-retaining ring 68 holds the top insert 66 to the upper portion of the main portion 59 of the housing.

To provide for holding the selector cap 45 in predetermined positions, there are a plurality of detent balls 69 urged outwardly by detent springs 70 housed in radially extended openings in the insert 66. The detent balls 69 are urged into complementary recesses in the selector cap 45 so that in the well-known manner the selector cap 45 may be manually turned to desired positions and held in the desired positions by the bias exerted by the balls 69 and springs 70.

Positioned over the top of the stem or rod 40 is a cap member 71. This cap member 71 receives the top of the stem or rod 40 in a manner to permit relatively some movement between the top cap 71 and the stem or rod 40. The cap 71 is urged upwardly by a coil spring 72 positioned between the top of the insert 66 and the under-portion of the cap 71. The lower edge of the cap 71 is turned outwardly to provide an outwardly extending flange and the accommodating opening in the member 48 has its edge turned inwardly to provide a radially inwardly extending flange. In this way, the cap 71 may be moved downwardly relative to the member 48 but is held from total removal from the member 48 by the engaging flanges of the cap 71 and cap member 48.

Positioned above and engaging the spring 42 within the central recess of the weight 38 is a top retainer disk 73. This retainer disk 73 abuts a split ring 75 engaged in an annular groove 74 provided in the stem or rod 40. Thus, the spring 42 resiliently urges the stem or rod 40 upwardly so as to urge the valve member 41 upwardly to its position shown in Figure 1.

The entire housing made up of body portions 54, 58 and 59 of the main regulating device and the body 20 of the first-stage assembly is carried by a mounting plate 76 having therein holes 77 for accommodating bolts used in mounting the entire device in the desired position.

In practice, the entire device is mounted adjacent an aviator's seat with the axis of the body substantially parallel to the spine of the aviator. The top of the device, that is, the cap 71 over the stem or rod 40, is positioned uppermost and readily available to the aviator so that he may manually depress the cap 71 and thus press downwardly the stem or rod 40. The cover screw 50 below the body portion 54 is positioned lowermost. The inlet port 11 is connected with an air compressor or tank of compressed air. The discharge port 51 is connected to the anti-"G" suit or other pressurizing device.

Still with the parts in the position shown in Figure 1, the weights are at their uppermost position. The weight 39 is held out of operation by the balls 44. However, if desired, the selector cap 45 may be revolved so that the balls 44 may move radially outward and thus release the weight 39 so that the effect of its weight may be added to the effect of the weight 38. The spring 42 resiliently urges the weight 38 upwardly and the spring 43 resiliently urges the weight 39 upwardly.

In this position of Figure 1, the control valve member 33 is closed and no air under pressure is being supplied to the pressurizing device, such as an aviator's suit. Upon the sudden turning of the airplane and the regulator carried thereby in such a manner as to urge the weights 38 and 39 downwardly toward the inlet chamber 55, the supporting effect of the springs is overcome. In Figure 2, the weight 38 has moved downwardly against the bias of the spring 42, while the weight 39 has been held in its upward position by the balls 44. The downward movement of the weight 38 has moved the stem or rod 40 downwardly and this, in turn, has moved the valve member 41 downwardly against the cup edge of the seat member 61. The rubber gasket 41–a seals this cup edge of the seat member 61 so as to cut off or terminate communication through the opening 63 between the discharge chamber 56 and exhaust chamber 57. At the same time, the downward pressure of the valve member 41 against the seat member 61 bends or flexes the diaphragm 37 and moves the seat member 61 downwardly. As the stem portion 33–b of the valve member 33 is secured to the seat member 61, the downward movement of the seat member 61 moves the control valve member 33 downwardly in an opening direction to the position shown in Figure 2. Compressed air is thus admitted on demand from the inlet chamber 55 up through openings 36–a to the discharge chamber 56. As the openings 63 are closed by the gasket 41–a, the compressed air is discharged to the anti-"G" suit or other pressurizing device through the discharge port 51.

When centrifugal force is no longer being exerted upon the weight 38, the spring 42 again raises the weight to its normal position and this, in turn, raises the valve member 41 upwardly back to its position shown in Figure 1. This permits the compressed air to be exhausted through the openings 63 into the exhaust chamber 57 and hence out through the exhaust port 64.

Also by the arrangement of the parts, if the pressure in the pressurizing device becomes excessive, this built-up excessive pressure may be released through the openings 63 by means of the excessive pressure raising the valve member 41 against the force of the weight 38. Thus, the degree of pressure applied to the pressurizing device is determined by the effective force of the weights balancing the effective force of fluid pressure on the diaphragm 37 and valve member 41.

In those instances in which it is desired to have the effect of more weight to impart a greater effect of centrifugal force to the regulating device, the selector cap 45 is rotated to permit the balls 44 to move outwardly and thus to release the weight 39. This arrangement is shown in Figure 3 in which it is seen that the weights 38 and 39 move together and their effect is additive in moving the stem or rod 40 downwardly and thus to press the valve member 41 against the cup edge of the seat member 61.

It is also to be noted that the device may be operated manually without the use of centrifugal force. This is accomplished by pressing downwardly on the cap 71 so as to move the stem or rod 40 downwardly to force the valve member 41 down against the cup edge of the seat member 61 and thus to open the control valve member 33. This will cause compressed air to be supplied to the anti-"G" suit even without the effect of centrifugal force. The operation of the valve parts is the same when operated manually as when operated by the force of the weights 38 and 39.

Some of the advantages of my device are as follows:

(1) Large variations in supplying pressure may be reduced to smaller variations at a lower pressure level by the first-stage reduction.

(2) From a closed or normal position to a predetermined opening value of "G" (which may be in a range of 1.5 to 2.0 "G"), all movable parts of the control stage remain supported by their respective springs, allowing the exhaust valve 41 to remain open and the control valve 33 to remain closed and thus no pressure is built up in the anti-"G" suit.

(3) Upon increasing "G," the increasing effect of weight members 38 and 39 will overcome the supporting spring forces to make contact between the valve member 41 and seat member 61 and through it to load the diaphragm 37 in accordance with the degree of acceleration.

(4) With the diaphragm 37 attached directly to the valve member 33, this valve member will open and allow compressed air to flow into the anti-"G" suit until pressure builds up to a point where its force on the diaphragm 37 will equal that imposed by the weights, thereby closing the control valve 33 and remaining in regulated balance until the degree of acceleration changes.

(5) A further increase in "G" will again produce an unbalance toward opening the inlet valve member 33 and allow pressure to build up to a correspondingly higher regulated level.

(6) On decreasing "G," the downward force of the weights will diminish to a point where the system pressure force acting on the exhaust valve—which is independent of the diaphragm assembly with respect to upward opening movement—will open the exhaust valve to bleed off pressure until the weight force again overbalances the system pressure to close the exhaust valve. If the "G" should drop to less than starting acceleration, the exhaust valves will open and vent the system to zero pressure.

Some additional distinctive features of this regulator are that all of the moving parts are direct-acting, without levers and complicated linkages; low friction guide bushings are used, such as nylon and Teflon plastic, wherever sliding motion occurs. Additional features, advantages and benefits will be apparent to those versed in this art upon consideration of the present disclosure.

This disclosure includes that contained in the appended claims, as well as that contained in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A valve for controlling the flow of fluid under pressure to and from a pressurizing device, comprising a body having an inlet chamber adapted to communicate with a source of fluid under pressure, an exhaust chamber adapted to communicate with a fluid exhaust port, and a discharge chamber adapted to communicate with said pressurizing device, said chambers being aligned along a common axis and said discharge chamber being positioned intermediate of said inlet chamber and said exhaust chamber, a control-valve member carried by, and movable axially of, said body and positioned upon movement in opening and closing directions to control communication between said inlet chamber and said discharge chamber, a flexible diaphragm carried by said body and separating said discharge chamber and said exhaust chamber, a valve-seat member carried by said diaphragm and movable with said diaphragm axially of said body, said valve-seat member having an opening therethrough providing communication between said discharge chamber and said exhaust chamber, said control-valve member and said valve-seat member being interengaged to provide for axial movement of said control valve member in an opening direction upon axial movement of said valve-seat member toward said inlet chamber and in a closing direction upon axial movement of said valve-seat member away from said inlet chamber, a valve-head member movable axially of said body in said exhaust chamber and adapted to seat on said valve-seat member to close said opening through the valve-seat member for controlling communication between said discharge chamber and said exhaust chamber, said valve-head member in unseated position being unconnected to said control-valve member to permit movement of the control-valve member unaffected by said valve-head member in unseated position, movement of said valve-head member against said valve-seat member closing said opening and flexing said diaphragm and moving said valve-seat member toward said inlet chamber to move said control-valve member in an opening direction, and mass means carried by said body and movable axially thereof in accordance with the degree of centrifugal force exerted on said mass means upon revolving of said body around a line at an angle to said axis of the body, resilient means carried by said body and yieldably supporting said mass means in inactive position without substantial effect on said valve-head member, said mass means and said valve-head member being interengaged to provide upon movement of said mass means by centrifugal force from said inactive position by said centrifugal force for the axial movement of said valve-head member toward and against said valve-seat member to flex said diaphragm and to move said control-valve member in an opening direction, pressure of fluid in said discharge chamber being exertable against said diaphragm to provide axial movement of the valve-seat member toward said exhaust chamber and to move said control valve member in a closing direction.

2. In a valve mechanism for supplying fluid under pressure from a source of said fluid under pressure to a pressurizing device and for exhausting said fluid under pressure, comprising in combination, a body having an inlet chamber, a discharge chamber and an exhaust chamber in alignment with said discharge chamber intermediate of said inlet chamber and said exhaust chamber, said inlet chamber being adapted to communicate with said source, said discharge chamber being adapted to communicate with said pressurizing device and said exhaust chamber being adapted to exhaust fluid outwardly of said body, a control valve controlling flow of said fluid from said inlet chamber to said discharge chamber, a flexible wall member positioned between said discharge chamber and said exhaust chamber, a valve-seat member carried by said flexible wall member, said valve-seat member having an opening therethrough for providing communication between said discharge chamber and said exhaust chamber, said valve-seat member and said control-valve member being interconnected to provide for movement of said control-valve member in accordance with movement of said valve-seat member carried by said flexible wall member, a valve-head member movably carried by said body and in alignment with said control-valve member and said valve-seat member, and mass means movably carried by said body and in alignment with said control-valve member and said valve-seat member, resilient means interconnecting said mass means and body to hold said mass means normally so as not to affect movement of said valve-head member, said mass means being responsive to centrifugal force upon swinging movement of said body, said mass means upon overcoming said resilient means by centrifugal force being arranged to move said valve-head member in response to said centrifugal force to engage and move said valve-seat member for closing said opening in the valve-seat member and for moving said control-valve member to provide communication between said inlet chamber and said discharge chamber.

3. In a valve mechanism for supplying fluid under pressure from a source of said fluid under pressure to a pressurizing device and for exhausting said fluid under pressure, comprising in combination, a body having an inlet chamber, a discharge chamber and an exhaust chamber in alignment with said discharge chamber intermediate of said inlet chamber and said exhaust chamber, said inlet chamber being adapted to communicate with said source, said discharge chamber being adapted to communicate with said pressurizing device and said exhaust chamber being adapted to exhaust fluid outwardly of said body, a control valve controlling flow of said fluid from said inlet chamber to said discharge chamber, a bellows defining a variable volume chamber on a side of said control valve adapted to vary upon movement of the control valve, said variable volume chamber being in communication through said control valve with said discharge chamber, a flexible wall member positioned between said discharge chamber and said exhaust chamber, a valve-seat member carried by said flexible wall member, said valve-seat member having an opening therethrough for providing communication between said discharge chamber and said exhaust chamber, said valve-seat member and said control-valve member being interconnected to provide for movement of said control-valve member in accordance with movement of said valve seat member carried by said flexible wall member, a valve-head member movably carried by said body and in alignment with said control-valve member and said valve-seat member, mass means movably carried by said body and in alignment with said control-valve member and said valve-seat member, said mass means being separate from and movable relative to said valve-head member, said mass means being responsive to centrifugal force upon swinging movement of said body, said mass means being arranged to move toward and then move said valve-head member in response to centrifugal force to engage and move said valve-seat member for closing said opening in the valve-seat member and for moving said control-valve member to provide communication between said inlet chamber and said discharge chamber, said mass means comprising a plurality of weights individually and collectively movable in response to centrifugal force, and selector means for holding selected of said weights against movement in response to centrifugal force.

4. In a valve mechanism for supplying fluid under pressure from a source of said fluid under pressure to a pressurizing device and for exhausting said fluid under pressure, comprising in combination, a body having an inlet chamber, a discharge chamber and an exhaust chamber in alignment with said discharge chamber intermediate of said inlet chamber and said exhaust chamber, said inlet chamber being adapted to communicate with said source, said discharge chamber being adapted to communicate with said pressurizing device and said exhaust chamber being adapted to exhaust fluid outwardly of said body, a control valve controlling flow of said fluid from said inlet chamber to said discharge chamber, pressure balancing means for substantially balancing the fluid pressure on opposite sides of said control valve, a flexible wall member positioned between said discharge chamber and said exhaust chamber, a valve seat member carried by said flexible wall member, said valve-seat member having an opening therethrough for providing communication between said discharge chamber and said exhaust chamber, said valve-seat member and said control-valve member being interconnected to provide for movement of said control-valve member in accordance with movement of said valve-seat member carried by said flexible wall member, a valve-head member movably carried by said body and in alignment with said control-valve member and said valve-seat member, mass means movably carried by said body independently of said valve-head member and in alignment with said control-valve member and said valve-seat member, said mass means being responsive to centrifugal force upon swinging movement of said body, said mass means being arranged to press against and to move said valve-head member in response to centrifugal force to engage and move said valve-seat member for closing said opening in the valve-seat member and for moving said control-valve member to provide communication between said inlet chamber and said discharge chamber, and biasing means for biasing said mass means away from said valve-seat member in opposition to centrifugal force impressed on said mass means.

5. In a valve mechanism for supplying fluid under pressure from a source of said fluid under pressure to a pressurizing device and for exhausting said fluid under pressure, comprising in combination, a body having an inlet chamber, a discharge chamber and an exhaust chamber in alignment with said discharge chamber intermediate of said inlet chamber and said exhaust chamber, said inlet chamber being adapted to communicate with said source, said discharge chamber being adapted to communicate with said pressurizing device and said exhaust chamber being adapted to exhaust fluid outwardly of said body, a control valve controlling flow of said fluid from said inlet chamber to said discharge chamber, pressure balancing means for substantially balancing the fluid pressure on opposite sides of said control valve, a flexible wall member positioned between said discharge chamber and said exhaust chamber, a valve-seat member carried by said flexible wall member, said valve-seat member having an opening therethrough for providing communication between said discharge chamber and said exhaust chamber, said valve-seat member and said control-valve member being interconnected to provide for movement of said control-valve member in accordance with movement of said valve-seat member carried by said flexible wall member, a valve-head member movably carried by said body and in alignment with said control-valve member and said valve-seat member, mass means movably carried by said body independently of the valve-head member and in alignment with said control-valve member and said valve-seat member, said mass means being responsive to centrifugal force upon swinging movement of said body, said mass means being arranged to press against the valve-head member and to move said valve-head member in response to centrifugal force to engage and move said valve-seat member for closing said opening in the valve-seat member and for moving said control-valve member to provide communication between said inlet chamber and said discharge chamber, and manually operable means for moving said valve-head member independently of said mass means to provide for closing said opening and moving said control-valve member to provide communication between said inlet chamber and said discharge chamber.

6. A regulating device for regulating the supply of fluid under pressure to a pressurizing device comprising the combination of first valve means for metering fluid under pressure from a source of said fluid to the pressurizing device, pressure balancing means for balancing fluid pressure on opposite sides of said first valve means, second valve means for exhausting fluid under pressure from said pressurizing device, connecting means connecting said first and second valve means for opening said first valve means in response to movement closing said second valve means, flexible diaphragm means for permitting movement of said first valve means and said second valve means beyond the movement required for closing said second valve means, said flexible diaphragm means being subject to fluid under pressure from said pressurizing device, and mass means resiliently supported independently of said flexible diaphragm means and adapted to move in response to centrifugal force toward said second valve means for providing movement closing said second valve means.

7. A regulating device for regulating the supply of fluid under pressure to a pressurizing device comprising the combination of a metering valve mechanism having a valve head and associated valve seat for metering fluid under pressure to said pressurizing device, pressure balancing means for balancing fluid pressure on said metering valve, an exhaust valve mechanism having a valve head and associated valve seat for exhausting said fluid under pressure, mass means movable in response to centrifugal force, an operating member extending from said exhaust valve mechanism for operating said exhaust valve mechanism, resilient biasing means urging said mass means to oppose centrifugal force and supporting the mass means independently of said exhaust valve mechanism, a rod extending axially of, and between, said metering valve mechanism and said exhaust valve mechanism to provide for movement of said metering valve mechanism upon movement of said exhaust valve mechanism beyond closing position of said exhaust valve mechanism, resilient diaphragm means subject to said fluid under pressure, said resilient diaphragm means permitting movement of said exhaust valve mechanism beyond the closing position of said exhaust valve mechanism, said resilient diaphragm means being movable independently of said resilient biasing means, said mass means in response to centrifugal force being arranged to overcome said resilient means and to move said operating member to operate said exhaust valve mechanism to close the same and to cause movement through said rod of said metering valve mechanism for opening the same.

8. In a pressure regulating device for an anti-"G" suit, the combination of a metering valve for admitting compressed air to said suit, an exhaust valve for exhausting compressed air from said suit, said exhaust valve having a movable head and a movable seat, flexible means carrying said movable seat to permit axial movement thereof, said metering valve having a fixed seat and a movable head, a rod extending axially of said valves and connecting said movable seat of the exhaust valve to the movable head of said metering valve, an operating member axially extending from said movable head of said exhaust valve, said operating member being unconnected to said rod to permit movement of the operating member independently of said rod, mass means surrounding said operating member and arranged to move the operating member by centrifugal force acting on said mass means, and coil spring means disposed around said operating member for providing resilient support for said mass means independently of said operating member, movement of said valve seat of the exhaust valve by said operating member initially operating said exhaust valve and sequentially operating said metering valve.

9. In an anti-"G" valve operable by centrifugal force moving a mass, the combination of valves comprising an exhaust valve having a movable seat and movable head, resilient means opposing relative movement between said head and said mass, a flexible diaphragm supporting the movable seat, means for moving the movable head by the movement of said mass in opposition to the resilient means sufficient to engage the movable seat and also to flex said diaphragm and move said movable seat, a metering valve disposed axially of said exhaust valve and having a fixed seat and movable head, pressure balancing means for balancing opposed fluid pressure on said head of the metering valve, a post disposed axially of said valves and connecting the movable seat of the exhaust valve to the movable head of the metering valve for providing movement of the movable head of the metering valve upon the movement of said movable seat of the exhaust valve, and guide means engaged by said post for guiding the said movement of said movable seat of the exhaust valve and said movable head of the metering valve.

10. In a regulating device the combination of an exhaust valve, a metering valve in axial alignment with said exhaust valve, said exhaust valve having a first part and a second part, operating means for axially moving the first part, flexible means supporting said second part to permit limited axial movement of said second part, said metering valve having a movable part, a connecting member unconnected to said operating means and disposed along the axis of said valves and connecting said second part and said movable part of the metering valve to provide for their simultaneous axial movement, and mass means resiliently supported independently of said operating means and responsive to centrifugal force for moving said operating means, operation of said operating means toward said second part moving said first part of the exhaust valve to close said exhaust valve and to move the second part of the exhaust valve and the movable part of the metering valve to open said metering valve, said flexible means providing for the movement of said exhaust valve and the movable part of the metering valve in an opposite direction by fluid pressure exerting a force on said exhaust valve opposed to, and exceeding, the operating force exerted by said operating means.

11. A regulating device comprising a body, said body having a fixed wall and a flexible wall, said fixed wall having a metering opening therethrough, said flexible wall having an exhaust opening therethrough, the space provided between said walls defining a discharge chamber adapted to communicate with a pressurizing device, a metering-valve member adapted to open and close the said metering opening, balancing means for balancing the fluid pressure on opposite sides of the said metering-valve member, an exhaust-valve member adapted to open and close said exhaust opening, connecting means connecting said flexible wall and said metering-valve member to provide for movement of said metering-valve member in accordance with movement of said flexible wall, and independently actuable operating means unconnected to said connecting means for moving said exhaust-valve member in one direction to close said exhaust valve opening and to move said flexible wall in a direction to open said metering valve opening, said flexible wall being disposed to provide that fluid pressure in said discharge chamber exerts a force in a second direction opposite of said one direction and tending to close said metering valve opening and to open said exhaust valve opening.

12. A regulating device comprising a body, said body having a fixed wall and a flexible wall, said fixed wall having a metering opening therethrough, said flexible wall having an exhaust opening therethrough, the space provided between said walls defining a discharge chamber adapted to communicate with a pressurizing device, a metering-valve member adapted to open and close the said metering opening, fluid pressure equalizing means for equalizing the fluid pressure exerted on opposite sides of said metering-valve member, an exhaust-valve member adapted to open and close said exhaust opening, connecting means connecting said flexible wall and said metering-valve member to provide for movement of said metering-valve member in accordance with movement of said flexible wall, and operating means for moving said exhaust-valve member in one direction to close said exhaust valve opening and to move said flexible wall in a direction to open said metering valve opening, said exhaust-valve member being movable in an opposite direction to open the exhaust valve opening independently of said connecting means, said flexible wall being disposed to provide that fluid pressure in said discharge chamber exerts a force in a second direction opposite of said one direction and tending to close said metering valve opening and to open said exhaust valve opening, said operating means including mass means responsive to centrifugal force encountered by said device and manual means for manual operation independently of said mass means.

13. A regulating device for regulating the supply of fluid under pressure to a pressurizing device comprising the combination of first valve means for metering fluid under pressure from a source of said fluid to the pressurizing device, second valve means for exhausting fluid under pressure from said pressurizing device, connecting means connecting said first and second valve means for opening said first valve means in response to movement closing said second valve means, flexible diaphragm means, subject to said fluid under pressure, for permitting movement of said first valve means and said second valve means beyond the movement required for closing said second valve means, mass means adapted to move in response to acceleration force for providing movement in one direction closing said second valve means, and resilient support means for supporting said mass means independently of said flexible diaphragm means in the absence of centrifugal force sufficient to overcome the resiliency of said support means.

14. A regulating device for regulating the supply of fluid under pressure to a pressurizing device comprising the combination of a metering valve mechanism having a valve head and associated valve seat for metering fluid under pressure to said pressurizing device, an exhaust valve mechanism having a valve head and associated valve seat for exhausting said fluid under pressure, mass means movable in response to acceleration force, an operating member extending from said exhaust valve mechanism for operating said exhaust valve mechanism to closed position, resilient biasing means urging said mass means to oppose centrifugal force and to resiliently support the mass means independently of said operating member, a rod extending axially of, and between, said metering valve mechanism and said exhaust valve mechanism to provide for movement of said metering valve mechanism upon movement of said exhaust valve mechanism beyond closing position of said exhaust valve mechanism, said rod being unconnected to said operating member to permit movement of the operating member and exhaust valve mechanism to open position independently of said rod, resilient diaphragm means permitting movement of said exhaust valve mechanism beyond the closing position of said exhaust valve mechanism, said resilient diaphragm means being movable independently of said resilient biasing means, said mass means in response to acceleration force being arranged to move said operating member to operate said exhaust valve mechanism to close the same and to cause movement through said rod of said metering valve mechanism for opening the same.

15. In a pressure regulating device for an anti-"G" suit, the combination of a metering valve for admitting compressed air to said suit, an exhaust valve for exhausting compressed air from said suit, said exhaust valve having a movable head and a movable seat, flexible means carrying said movable seat to permit axial movement thereof, said metering valve having a fixed seat and a movable head, a rod extending axially of said valves and connecting said movable seat of the exhaust valve to the movable head of said metering valve, an operating member connected to and axially extending from said movable head of said exhaust valve and movable independently of said rod, mass means surrounding said operating member and arranged to move the operating member by acceleration force acting on said mass means, and coil spring means disposed around said operating member for providing resilient support for said mass means independently of said operating member, movement of said valve head of the exhaust valve by said operating member initially moving said exhaust valve seat and sequentially operating said metering valve.

16. In an anti-"G" valve operable by acceleration force moving a mass, the combination of valves comprising an exhaust valve having a movable seat and movable head, a flexible diaphragm supporting the movable seat, operating means for moving the movable head by the movement of said mass sufficient to engage the movable seat and also to flex said diaphragm and move said movable seat, said operating means including resilient means for resiliently supporting said mass without affecting the movement of said movable head in the absence of a selected degree of acceleration force and interengaging means for overcoming the resilient means to permit the mass to affect the movement of the movable head upon subjection to said selected degree of acceleration force, a metering valve disposed axially of said exhaust valve and having a fixed seat and movable head, a post disposed axially of said valves and connecting the movable seat of the exhaust valve to the movable head of the metering valve for providing movement of the movable head of the metering valve upon the movement of said movable seat of the exhaust valve, and guide means engaged by said post for guiding the said movement of said movable seat of the exhaust valve and said movable head of the metering valve.

References Cited in the file of this patent

UNITED STATES PATENTS

| | | |
|---|---|---|
| 2,092,819 | Tennant | Sept. 14, 1937 |
| 2,622,609 | Moller | Dec. 23, 1952 |
| 2,823,687 | Gabriel | Feb. 18, 1958 |